United States Patent
Geng (10) Patent No.: US 11,450,309 B2
(45) Date of Patent: Sep. 20, 2022

(54) INFORMATION PROCESSING METHOD AND SYSTEM, COMPUTER SYSTEM AND COMPUTER READABLE MEDIUM

(71) Applicants: Beijing JingDong ShangKe Information Technology Co., Ltd., Beijing (CN); Beijing Jingdong Century Trading Co., Ltd., Beijing (CN)

(72) Inventor: Ling Geng, Beijing (CN)

(73) Assignees: Beijing JingDong ShangKe Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 184 days.

(21) Appl. No.: 16/762,074

(22) PCT Filed: Sep. 29, 2018

(86) PCT No.: PCT/CN2018/108689
§ 371 (c)(1),
(2) Date: May 6, 2020

(87) PCT Pub. No.: WO2019/091248
PCT Pub. Date: May 16, 2019

(65) Prior Publication Data
US 2020/0349918 A1    Nov. 5, 2020

(30) Foreign Application Priority Data
Nov. 7, 2017   (CN) .......................... 201711087980.3

(51) Int. Cl.
*G10L 25/21*   (2013.01)
*G10L 25/60*   (2013.01)
(Continued)

(52) U.S. Cl.
CPC .............. *G10L 15/01* (2013.01); *G10L 15/22* (2013.01); *G10L 25/21* (2013.01); *G10L 25/60* (2013.01); *G10L 25/84* (2013.01)

(58) Field of Classification Search
CPC ......... G10L 15/01; G10L 15/22; G10L 25/21; G10L 25/60; G10L 25/84; G10L 2021/02082
See application file for complete search history.

(56) References Cited

U.S. PATENT DOCUMENTS 9,319,816 B1    4/2016 Narayanan
9,558,757 B1 *  1/2017 Li ........................ G10L 21/0208
(Continued)

FOREIGN PATENT DOCUMENTS

CN       1741686       3/2006
CN       102750956     10/2012
(Continued)

OTHER PUBLICATIONS

Samarasinghe, Prasanga N., Thushara D. Abhayapala, and Hanchi Chen. "Estimating the direct-to-reverberant energy ratio using a spherical harmonics-based spatial correlation model." IEEE/ACM Transactions on Audio, Speech, and Language Processing 25.2 (2016): 310-319.*
(Continued)

*Primary Examiner* — Paras D Shah
(74) *Attorney, Agent, or Firm* — Hamre, Schumann, Mueller & Larson, P.C.

(57) ABSTRACT

The present disclosure provides an information processing method, including: acquiring a voice test signal, wherein the voice test signal is used for testing an influence parameter of a specified environment on a voice signal; acquiring a voice feedback signal obtained after the voice test signal is reflected by at least one reflecting object, wherein the at least
(Continued)

one reflecting object is located in the specified environment; and estimating the influence parameter of the specified environment on the voice signal based on the voice test signal and the voice feedback signal acquired. In addition, the present disclosure also provides an information processing system, a computer system and a computer readable medium.

10 Claims, 9 Drawing Sheets

(51) Int. Cl.
  G10L 25/84 (2013.01)
  G10L 15/01 (2013.01)
  G10L 15/22 (2006.01)

(56) References Cited

U.S. PATENT DOCUMENTS

| | | | | |
|---|---|---|---|---|
| 9,992,572 | B2* | 6/2018 | Buck | H04R 3/04 |
| 2006/0078130 | A1* | 4/2006 | Jorgensen | G09B 23/14 |
| | | | | 381/61 |
| 2014/0300542 | A1 | 10/2014 | Jakubiak et al. | |
| 2015/0012268 | A1* | 1/2015 | Nakadai | G10L 15/20 |
| | | | | 704/233 |
| 2016/0232914 | A1* | 8/2016 | Liang | G10L 21/0208 |
| 2017/0019695 | A1* | 1/2017 | Lee | H04N 21/44204 |
| 2017/0289798 | A1* | 10/2017 | Weizman | H04W 12/04 |
| 2017/0303053 | A1* | 10/2017 | Falch | A61N 1/36036 |
| 2017/0347180 | A1* | 11/2017 | Petrank | H04R 1/1083 |
| 2018/0233161 | A1* | 8/2018 | Kagoshima | H04R 3/04 |
| 2018/0286423 | A1* | 10/2018 | Nakadai | G10L 21/028 |
| 2018/0359582 | A1* | 12/2018 | Belhomme | H04R 29/00 |
| 2019/0035415 | A1* | 1/2019 | Lu | G10L 21/0224 |

FOREIGN PATENT DOCUMENTS

| | | |
|---|---|---|
| CN | 104866083 | 8/2015 |
| CN | 105425954 | 3/2016 |
| CN | 105580076 | 5/2016 |
| CN | 106105272 | 11/2016 |
| CN | 106612482 | 5/2017 |
| CN | 106688247 | 5/2017 |
| CN | 107203756 | 9/2017 |
| JP | 2016-143043 | 8/2016 |

OTHER PUBLICATIONS

International Search Report, issued in the corresponding PCT application No. PCT/CN2018/108689, dated Nov. 220, 2018, 5 pages.
Chinese Office Action, issued in the corresponding Chinese Patent Application No. 201810331949.8, dated Nov. 9, 2020, 12 pages.
Chinese Office Action, issued in the corresponding Chinese Patent Application No. 201711087980.3, dated May 12, 2020, 16 pages.

* cited by examiner

INFORMATION PROCESSING METHOD AND SYSTEM, COMPUTER SYSTEM AND COMPUTER READABLE MEDIUM

CROSS-REFERENCE TO RELATED APPLICATION(S)

This application is a U.S. National Phase Application of International Application No. PCT/CN2018/108689, filed on Sep. 29, 2018, entitled "INFORMATION PROCESSING METHOD AND SYSTEM, COMPUTER SYSTEM AND COMPUTER READABLE MEDIUM," which claims priority to Chinese Application No. 201711087980.3, filed on Nov. 7, 2017, both of which are incorporated herein by reference in their entirety.

TECHNICAL FIELD

The present disclosure relates to the field of data processing, and more particularly, to an information processing method and system, a computer system and a computer readable medium.

BACKGROUND

A voice signal received by a sound gathering apparatus of an electronic device includes, in addition to a valid signal, a delayed attenuation signal caused by reflections from objects in an environment, such as reverberation. The presence of reverberation may seriously affect the valid signal and reduce quality and reliability of the received voice signal. Different environments may have different reverberation parameters. A related technology provides a method for estimating the reverberation parameters and for removing an effect of the reverberation on the valid signal using a reverberation model.

In implementing the concept of the present disclosure, the inventors found that there existed at least following problems in the related technology: an estimation of the reverberation parameters usually requires to be made by professionals based on their experiences, but in most cases those estimations are made by non-professionals. Therefore, additional special detection equipment is needed for a measurement, which is of poor feasibility and costly.

With respect to above problems in the related technology, no effective solution has been proposed at present.

SUMMARY

In view of the above, the present disclosure provides an information processing method, a system thereof, a computer system and a computer readable medium.

In one aspect of the present disclosure, there is provided an information processing method, comprising: acquiring a voice test signal, wherein the voice test signal is used for testing an influence parameter of a specified environment on a voice signal; acquiring a voice feedback signal obtained after the voice test signal is reflected by at least one reflecting object, wherein the at least one reflecting object is located in the specified environment; and estimating the influence parameter of the specified environment on the voice signal based on the voice test signal and the voice feedback signal acquired.

According to an embodiment of the present disclosure, estimating the influence parameter of the specified environment on the voice signal based on the voice test signal and the voice feedback signal acquired comprises: determining test information corresponding to the voice test signal and feedback information corresponding to the voice feedback signal; loading a parameter estimation model; inputting the test information and the feedback information into the parameter estimation model, so that the parameter estimation model outputs estimation information of the influence parameter in response to the test information and the feedback information; and estimating the influence parameter of the specified environment on the voice signal using the estimation information of the influence parameter.

According to an embodiment of the present disclosure, determining test information corresponding to the voice test signal and feedback information corresponding to the voice feedback signal comprises: determining a playing time when an electronic device plays the voice test signal, wherein the test information includes the playing time; and determining a receiving time when the electronic device receives the voice feedback signal, and sound wave information of a sound wave corresponding to the voice feedback signal, wherein the feedback information includes the receiving time and the sound wave information, and the sound wave information includes an amplitude of the sound wave or energy of the sound wave.

According to an embodiment of the present disclosure, acquiring a voice feedback signal obtained after the voice test signal is reflected by at least one reflecting object comprises: acquiring the voice feedback signal within a preset time period after the voice test signal is sent.

According to an embodiment of the present disclosure, the method further comprises: acquiring at least one voice file, wherein each of the at least one voice file is able to generate a corresponding voice signal when played by an electronic device; acquiring a screening condition for screening the voice signal; selecting a voice file, a voice signal generated from which is capable of meeting the screening condition, from the at least one voice file; and playing the selected voice file with the electronic device to generate the voice test signal.

In another aspect of the present disclosure, there is provided an information processing system, comprising: a first acquisition module, configured to acquire a voice test signal, wherein the voice test signal is used for testing an influence parameter of a specified environment on a voice signal; a second acquisition module, configured to acquire a voice feedback signal obtained after the voice test signal is reflected by at least one reflecting object, wherein the at least one reflecting object is located in the specified environment; and an estimation module, configured to estimate the influence parameter of the specified environment on the voice signal based on the voice test signal and the voice feedback signal acquired.

According to an embodiment of the present disclosure, the estimation module comprises: a determination unit, configured to determine test information corresponding to the voice test signal and feedback information corresponding to the voice feedback signal; a loading unit, configured to load a parameter estimation model; a processing unit, configured to input the test information and the feedback information into the parameter estimation model, so that the parameter estimation model outputs estimation information of the influence parameter in response to the test information and the feedback information; and an estimation unit, configured to estimate the influence parameter of the specified environment on the voice signal using the estimation information of the influence parameter.

According to an embodiment of the present disclosure, the determination unit comprises: a first determination subunit, configured to determine a playing time when an electronic device plays the voice test signal, wherein the test information includes the playing time; and a second determination subunit, configured to determine a receiving time when the electronic device receives the voice feedback signal, and sound wave information of a sound wave corresponding to the voice feedback signal, wherein the feedback information includes the receiving time and the sound wave information, and the sound wave information includes an amplitude of the sound wave or energy of the sound wave.

According to an embodiment of the present disclosure, the second acquisition module is further configured to: acquire the voice feedback signal within a preset time period after the voice test signal is sent.

According to an embodiment of the present disclosure, the above-mentioned system further includes: a third acquisition module, configured to acquire at least one voice file, wherein each of the at least one voice file is able to generate a corresponding voice signal when played by an electronic device; a fourth acquisition module, configured to acquire a screening condition for screening the voice signal; a selection module, configured to select a voice file, a voice signal generated from which is capable of meeting the screening condition, from the at least one voice file; and a playing module, configured to play the selected voice file with the electronic device to generate the voice test signal.

In another aspect of the present disclosure, there is provided a computer system comprising: one or more processors; and a storage, configure to store one or more programs, wherein the one or more programs, when executed by the one or more processors, cause the one or more processors to implement the information processing method of any of the foregoing.

In another aspect of the present disclosure, there is provided a computer readable medium having stored thereon executable instructions that, when executed by a processor, cause the processor to implement the information processing method of any of the foregoing.

According to the embodiment of the present disclosure, in a specified environment, a voice test signal for testing an influence parameter of the specified environment on a voice signal is acquired on the one hand, and a voice feedback signal obtained after the voice test signal is reflected by at least one reflecting object is acquired on the other hand, and the influence parameter of the specified environment on the voice signal is estimated based on the voice test signal and the voice feedback signal. By adopting such a technical solution, a technical problem in the related technology can be at least overcome in part. The technical problem in the related technology is as follows: when estimating the influence parameter of the specified environment on the voice signal, either it is necessary for a professional to estimate according to his experience, or it is necessary for a nonprofessional to make measurement using additional special detection equipment, which leads to inconvenience in operation, that is, poor feasibility. As a result, according to the embodiment of the present disclosure, an electronic device can adaptively complete by its self a measurement of the influence parameter of the specified environment on the voice signal according to changes of the specified environment, which is easy to operate and of strong feasibility, and can effectively reduce a use cost of the equipment.

BRIEF DESCRIPTION OF THE DRAWINGS

The above and other objects, features, and advantages of the present disclosure will become more apparent from following descriptions on embodiments thereof with reference to accompanying drawings, in which.

DETAILED DESCRIPTION

Hereinafter, embodiments of the present disclosure will be described with reference to the drawings. However, it should be understood that these descriptions are illustrative and not intended to limit the present disclosure. Further, in the following, known structures and technologies are not described to avoid obscuring the present disclosure unnecessarily.

The terminology used herein is for the purpose of describing particular embodiments only and is not intended to limit the present disclosure. As used herein, the terms "including", "comprising" and the like indicate the presence of stated features, steps, operations, and/or components, but do not preclude the presence or addition of one or more other features, steps, operations or components.

All terms (including technical and scientific terms) used herein have the meaning commonly understood by those skilled in the art unless otherwise defined. It should be noted that the terms used herein should be interpreted to have meanings consistent with the context of this specification, and should not be interpreted in an idealized or overly rigid manner.

Where expressions such as "at least one of A, B and C, and the like" are used, they should generally be interpreted in accordance with meanings commonly understood by those skilled in the art (for example, "A system having at least one of A, B, and C" should include but not limited to a system having A alone, B alone, C alone, A and B, A and C, B and C, and/or A, B, C, and the like). Where expressions such as "at least one of A, B or C" are used, they should generally be interpreted in accordance with the meaning commonly understood by those skilled in the art (for example, "A system having at least one of A, B or C" should include but not limited to a system having A alone, B alone, C alone, A and B, A and C, B and C, and/or A, B, C, and the like). Those skilled in the art should also understand that transition conjunctions and/or phrases that essentially arbitrarily represent two or more optional items, whether in the description, the claims, or the drawings, should be understood as giving the inclusion of possibility of one of these items, either of these items, or both. For example, the phrase "A or B" should be understood to include the possibility of "A" or "B", or "A and B".

An embodiment of the present disclosure provides an information processing method, including: acquiring a voice test signal, wherein the voice test signal is used for testing an influence parameter of a specified environment on a voice signal; acquiring a voice feedback signal obtained after the voice test signal is reflected by at least one reflecting object, wherein the at least one reflecting object is located in the specified environment; and estimating the influence parameter of the specified environment on the voice signal based on the voice test signal and the voice feedback signal acquired.

Figure 1:
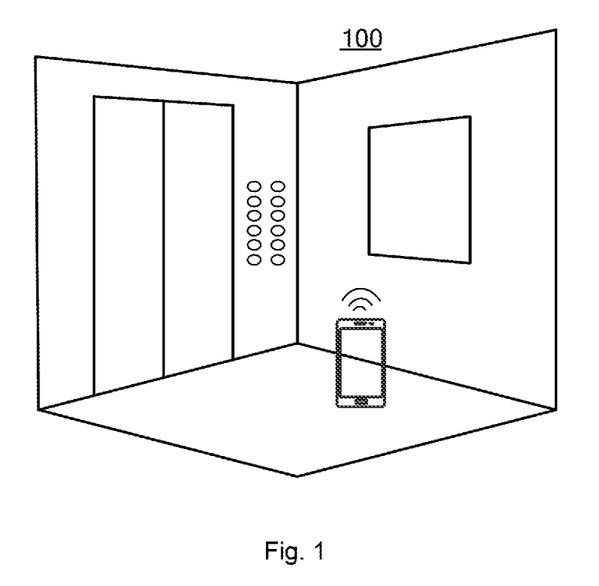
FIG. 1 schematically illustrates an application scenario in which an information processing method and a system thereof can be applied according to an embodiment of the present disclosure.

FIG. 1 schematically illustrates an application scenario 100 in which an information processing method and a system thereof may be applied according to an embodiment of the present disclosure. It should be noted that, FIG. 1 is only an example of an application scenario in which an embodiment of the present disclosure may be applied, so as to help those skilled in the art understand technical contents of the present disclosure, but it does not mean that the embodiments of the present disclosure cannot be applied to other devices, systems, environments, or scenarios.

As shown in FIG. 1, in this application scenario 100, a terminal device located in a certain specified environment may be various electronic devices with speakers and having voice playing functions, including but not limited to smartphones, tablets, laptops and desktop computers, and the like. The present disclosure does not limit the types of terminal devices. Also, various client applications may be installed on the terminal device. These client applications include various client applications for sending/receiving a voice signal, which are not limited herein.

Due to an influence of a layout or a spatial position in the specified environment, when a voice signal propagating in the form of sound waves propagates in the specified environment, it encounters one or more reflecting objects, such as walls, floors, and the like, existing in the specified environment. While a propagation path is changed, part of energy may also be absorbed by those reflecting objects existing in the specified environment. As a result, the voice signal received by the sound gathering apparatus of the terminal device includes, in addition to the valid signal, a delayed attenuation signal caused by reflections from objects in the environment, such as reverberation. When the layout or the spatial position of the specified environment changes, the reverberation may also change accordingly. Therefore, before playing an audio/video file with the terminal device, it is necessary to estimate the reverberation parameters of the specified environment, such as an indoor environment, in advance.

According to an embodiment of the present disclosure, the terminal device may acquire a voice test signal for testing an influence parameter of a specified environment on a voice signal on the one hand, and acquire a voice feedback signal obtained after the voice test signal is reflected by at least one reflecting object on the other hand, and estimate the influence parameter of the specified environment on the voice signal based on the voice test signal and the voice feedback signal. As a result, an electronic device may adaptively complete by its self a measurement of the influence parameter of the specified environment on the voice signal according to changes of the specified environment.

It should be noted that the information processing method provided by the embodiment of the present disclosure may generally be executed by a terminal device. Correspondingly, the information processing system provided by the embodiment of the present disclosure may also be provided in the terminal device.

It should be understood that the number of terminal devices in FIG. 1 is merely exemplary. The terminal devices may be of any number, according to implementation needs.

One aspect of the present disclosure provides an information processing method.

Figure 2:
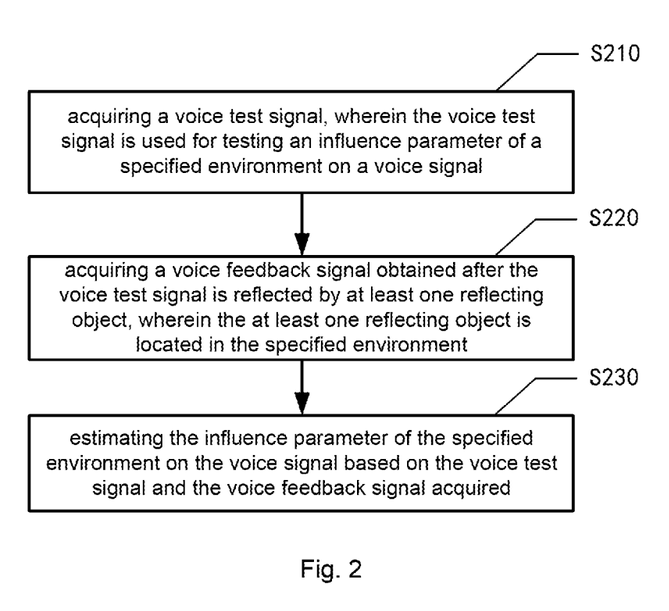
FIG. 2 schematically illustrates a flowchart of an information processing method according to an embodiment of the present disclosure.

FIG. 2 schematically illustrates a flowchart of an information processing method according to an embodiment of the present disclosure.

As shown in FIG. 2, the method may include operations S210~S230.

In operation S210, a voice test signal is acquired, wherein the voice test signal is used for testing an influence parameter of a specified environment on a voice signal.

In operation S220, a voice feedback signal obtained after the voice test signal is reflected by at least one reflecting object is acquired, wherein the at least one reflecting object is located in the specified environment.

In operation S230, the influence parameter of the specified environment on the voice signal is estimated based on the voice test signal and the voice feedback signal acquired.

A sound wave will be reflected by reflecting objects existing in the environment during its propagation, such as walls, ceilings, floors, and the like, in an indoor environment. Every time the sound wave is reflected, some energy is absorbed by the reflecting objects. When a sound source stops sounding, the sound wave will be still reflected and absorbed multiple times, and finally disappear. This makes one feel that several sound waves would be still mixed for a while after the sound source stops sounding. A multi-propagation effect introduces echo and spectral distortion, that is, reverberation, in an observation system. Because microphone sound source localization technology uses a microphone to pick up a voice signal and analyzes and processes the voice signal using a digital signal processing method, and then determines and tracks a spatial location of the sound source, the presence of reverberation will seriously affect the quality of the voice signal. Therefore, removing the reverberation has a great effect on improving the quality of the voice signal and the accuracy of subsequently locating and tracking of the sound source according to a microphone array.

In order to remove the reverberation, in the embodiment of the present disclosure, a reverberation model may be used to predict the reverberation. There is a very important model parameter in the reverberation model, which is used to reflect the influence of the specified environment on the voice signal, such as a reverberation attenuation factor (or a reverberation time). It should be noted that the influence parameter needed to be estimated includes, but not limited to, the reverberation attenuation factor, and may also be other reverberation model parameters, which are not limited here.

For the same voice signal, different scenarios and environments may have different reverberation effects. Therefore, if the electronic device is used in different scenarios and environments, it is necessary to estimate the reverberation model parameters in the scenarios in advance, so as to use the reverberation models to predict the reverberation of the voice signals in different scenarios and environments, and then remove negative effects of the reverberation. As a result, the purpose of improving the quality of the voice signal is achieved.

In a related technology, an attenuation model is generally used. As shown in the empirical calculation formula of the reverberation attenuation factor provided by Sabine formula, the reverberation attenuation factor is approximately proportional to the volume of the room and inversely proportional to the total sound absorption of the room. That is, estimation is made based on the room's space and decoration materials used by the ceiling, wall, and floor. In an actual operation, this parameter estimation of the reverberation attenuation factor provided by the related technology is not convenient. Professionals can estimate according to the environment of the room, however, non-professionals need to be equipped with special testing equipment for measurement, which reduces operability and increases the cost of use.

In an influence parameter estimation method provided by the embodiment of the present disclosure, the voice test signal is sent from a voice playing apparatus, such as a speaker, of the electronic device. The voice feedback signal acquired by the electronic device is obtained after the voice test signal is reflected by at least one reflecting object, and the at least one reflecting object is located in the specified environment. It may be understood that the voice feedback signal has carried relevant information of each reflecting object in the specified environment due to the modification by the reflection from at least one reflecting object in the specified environment. The method in which an influence parameter of a specified environment on a voice signal is estimated based on a voice test signal and a voice feedback signal acquired may be considered as an adaptive reverberation parameter estimation method. The method may estimate the reverberation parameter of current environment before the electronic device actually starts work. When the environment where the electronic device is located changes, such as an indoor layout is changed, or the place where the electronic device being used is changed, the electronic device may autonomously estimate the influence parameter, such as a reverberation model parameter, of the current environment on the voice signal before collecting the voice signal. In other words, there may be at least one different reflecting object in different environments, and the voice feedback signals reflected by the at least one reflecting object are also different, which can precisely reflect the modification effect by the current environment on the voice test signal.

According to the embodiment of the present disclosure, in a specified environment, a voice test signal for testing an influence parameter of the specified environment on a voice signal is acquired on the one hand, and a voice feedback signal obtained after the voice test signal is reflected by at least one reflecting object is acquired on the other hand, and the influence parameter of the specified environment on the voice signal is estimated based on the voice test signal and the voice feedback signal. By adopting such a technical solution, a technical problem in the related technology can be at least overcome in part. The technical problem in the related technology is as follows: when estimating the influence parameter of the specified environment on the voice signal, either it is necessary for a professional to estimate according to his experience, or it is necessary for a non-professional to make measurement using additional special detection equipment, which leads to inconvenience in operation, that is, poor feasibility. As a result, according to the embodiment of the present disclosure, an electronic device can adaptively complete by its self a measurement of the influence parameter of the specified environment on the voice signal according to changes of the specified environment, which is easy to operate and of strong feasibility, and can effectively reduce a use cost of the equipment.

The information processing method shown in FIG. 2 is further described below with reference to FIGS. 3A to 3C in combination with specific embodiments.

Figure 3A:
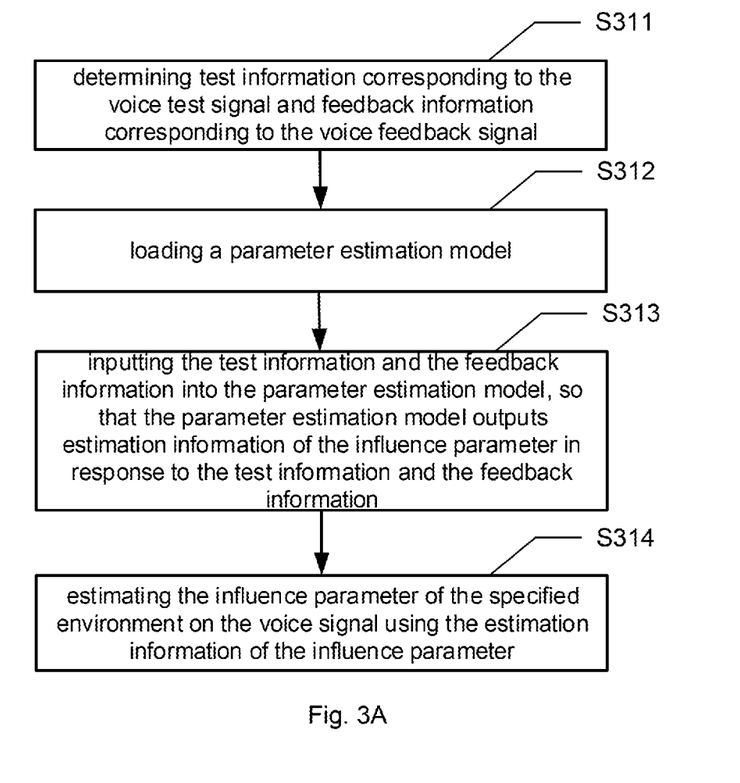
FIG. 3A schematically illustrates a flowchart of estimating an influence parameter of a specified environment on a voice signal based on a voice test signal and a voice feedback signal acquired according to an embodiment of the present disclosure.

FIG. 3A schematically illustrates a flowchart of estimating an influence parameter of a specified environment on a voice signal based on a voice test signal and a voice feedback signal acquired according to an embodiment of the present disclosure.

In this embodiment, in addition to operations S210~S230 described in the embodiment corresponding to FIG. 2 above, the information processing method may further include operations S311~S314. Specifically, operation S230 (estimating the influence parameter of the specified environment on the voice signal based on the voice test signal and the voice feedback signal acquired) described in the embodiment corresponding to FIG. 2 may be replaced by operations S311 S314. For brevity of description, descriptions of operations S210~S230 described in FIG. 2 are omitted here. As shown in FIG. 3A, in which:

In operation 311, test information corresponding to the voice test signal and feedback information corresponding to the voice feedback signal are determined.

In operation 312, a parameter estimation model is loaded.

In operation 313, the test information and the feedback information are input into the parameter estimation model, so that the parameter estimation model outputs estimation information of the influence parameter in response to the test information and the feedback information.

In operation 314, the influence parameter of the specified environment on the voice signal is estimated using the estimation information of the influence parameter.

For the voice test signal and the voice feedback signal acquired, a process of estimating the influence parameter of the specified environment on the voice signal may be described as: converting the voice signal acquired into voice information that can be recognized by the parameter estimation model, such as energy, frequency and amplitude, and the like. Specifically, the voice test signal may be processed and analyzed to be converted into voice test information, and the voice feedback signal may be processed and analyzed to be converted into voice feedback information. The embodiments disclosed do not limit a specific conversion method herein for converting a signal into information. Any method capable of converting the voice signal received into voice information is within the protection scope of the present disclosure.

Determined test information corresponding to the voice test signal and feedback information corresponding to the voice feedback signal are input into the parameter estimation model, and estimation information of the influence parameter such as the reverberation attenuation factor may be output according to the parameter estimation module. It should be noted that the parameters that need to be estimated in the parameter estimation model include, but not limited to, the reverberation attenuation factors, and may also be corresponding parameters of other reverberation models. In a specific embodiment, the corresponding parameters needs to be estimated may be determined according to different reverberation models. Here, the parameter, the reverberation attenuation factor, is taken as an example only, to describe correspondingly a specific implementation process of the embodiment of the present disclosure, but not a limitation of the embodiment of the present disclosure.

The influence parameter of the specified environment on the voice signal is estimated using the estimation information of the influence parameter. According to an estimated influence parameter, noise estimation elimination may be performed, such as framing, windowing, and fast Fourier transforming a signal, transforming a signal from time domain to frequency domain, removing a noise component calculated according to a noise model and the reverberation model, to obtain a processed voice signal. A specific implementation is not the focus of the embodiments of the present disclosure, and is not limited here.

Delay summation, spectrum weighting and calculation of cross power spectrum are used for a signal after being processed by removing noise, to form a beam. After that, a spherical grid model is established for the entire space. The entire space is searched according to the formed beam to find the points with the greatest energy as potential positions of the sound source. The position of the sound source is tracked using particle filter calculations. The above is an entire process of tracking and locating the sound source using a microphone array, which is neither a limitation to the embodiments of the present disclosure, nor is the focus of this solution, and is not repeated here.

According to the embodiments of the present disclosure, the voice feedback signal is obtained after being reflected by at least one reflecting object located in the specified environment, that is, the voice feedback signal modified by the specified environment directly carries influence factors of the specified environment on the voice signal, and the influence parameter is estimated by inputting the test information and feedback information determined by the voice test signal and the voice feedback signal into the parameter estimation model. Therefore, a purpose of processing large-scale data and a technical effect of simplifying the process and improving estimation accuracy can be achieved.

Figure 3B:
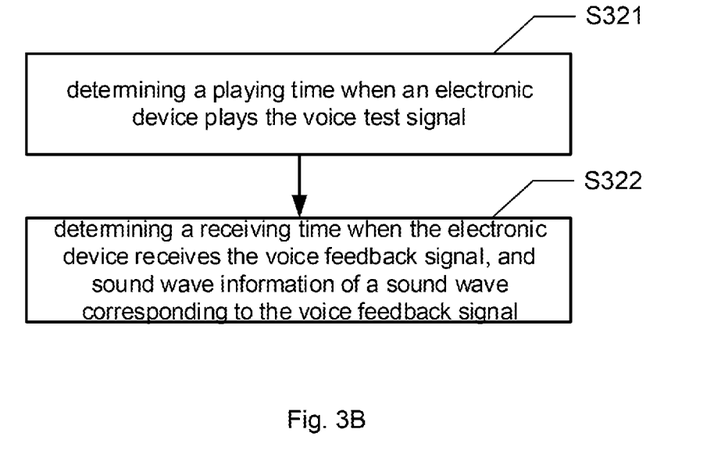
FIG. 3B schematically illustrates a flowchart of determining test information corresponding to a voice test signal and feedback information corresponding to a voice feedback signal according to an embodiment of the present disclosure.

FIG. 3B schematically illustrates a flowchart of determining test information corresponding to a voice test signal and feedback information corresponding to a voice feedback signal according to an embodiment of the present disclosure.

In this embodiment, in addition to operations S311-S314 described in the embodiment corresponding to FIG. 3A above, the information processing method may further include operations S321~S322. Specifically, operation S311 (determining test information corresponding to the voice test signal and feedback information corresponding to the voice feedback signal) described in the embodiment corresponding to FIG. 3A may be replaced with operations S321~S322. For brevity of description, descriptions of operations S311~S314 described in FIG. 3A are omitted here. As shown in FIG. 3B, in which:

In operation 321, a playing time when an electronic device plays the voice test signal is determined, wherein the test information includes the playing time.

In operation 322, a receiving time when the electronic device receives the voice feedback signal and sound wave information of a sound wave corresponding to the voice feedback signal are determined, wherein the feedback information includes the receiving time and the sound wave information, and the sound wave information includes an amplitude of the sound wave or energy of the sound wave.

In order to facilitate understanding, a relatively simple reverberation model will be taken as an example to describe in detail the determination of test information corresponding to the voice test signal and feedback information corresponding to the voice feedback signal according to the embodiment of the present disclosure. Specific algorithms of other parameter estimation models may be implemented accordingly based on spirit of the embodiments of the present disclosure, and are not repeated here.

The reverberation model equation is as follows:

$$y(t) = A^* \exp(-a(t-t_0)) \quad (1)$$

wherein y(t) represents an amplitude value of a voice signal at time t, $t_0$ represents a playing time when a playing apparatus (such as a speaker) of an electronic device plays a voice test signal, A represents an amplitude value of a voice test signal sent from a speaker, and a represents an influence parameter needed to be estimated.

Take logarithm of both sides of equation (1) to obtain:

$$a = -\frac{1}{t-t_0} \ln \frac{y(t)}{A} \quad (2)$$

In order to facilitate explaining, that the voice test signal played through the electronic device is a single frequency pulse signal is taken as an example to describe the embodiment of the present disclosure.

After the voice test signal is being played, the voice signal is collected by a microphone, and energy of the voice signal at the corresponding moment is calculated. Finally, a prediction of the influence parameter is performed based on the reverberation model established and data that the voice feedback information collected varying over time, using parameter recognition algorithm.

According to the voice feedback signal acquired by the microphone, an estimation result of parameter a collected at the i-th time may be obtained:

$$\hat{a}_i = -\frac{1}{t_i - t_0} \ln \frac{y(t_i)}{A} \quad (3)$$

Assuming that the microphone collected N voice feedback signals in total (specific times are related to the specified environment in which the electronic device is located), a final parameter estimation result is:

$$\hat{a} = \frac{1}{N} \sum_{i=1}^{N} \hat{a}_i \quad (4)$$

As for the parameter estimation method, other parameter estimation methods may also be used, such as recursive least square method, maximum likelihood estimation, and the like, which are not limited here.

According to the embodiments of the present disclosure, since the playing time of the test signal and the sound wave information of the feedback signal are acquired, an operation process is simplified and is of strong feasibility, and a technical effect of improving an estimation efficiency is achieved.

According to the embodiments of the present disclosure, acquiring the voice feedback signal obtained after the voice test signal is reflected by at least one reflecting object includes acquiring the voice feedback signal within a preset time period after the voice test signal is sent.

According to the embodiments of the present disclosure, since the feedback signal within a preset time period is acquired, signal redundancy and operation data can be reduced, and operation efficiency can be improved.

Figure 3C:
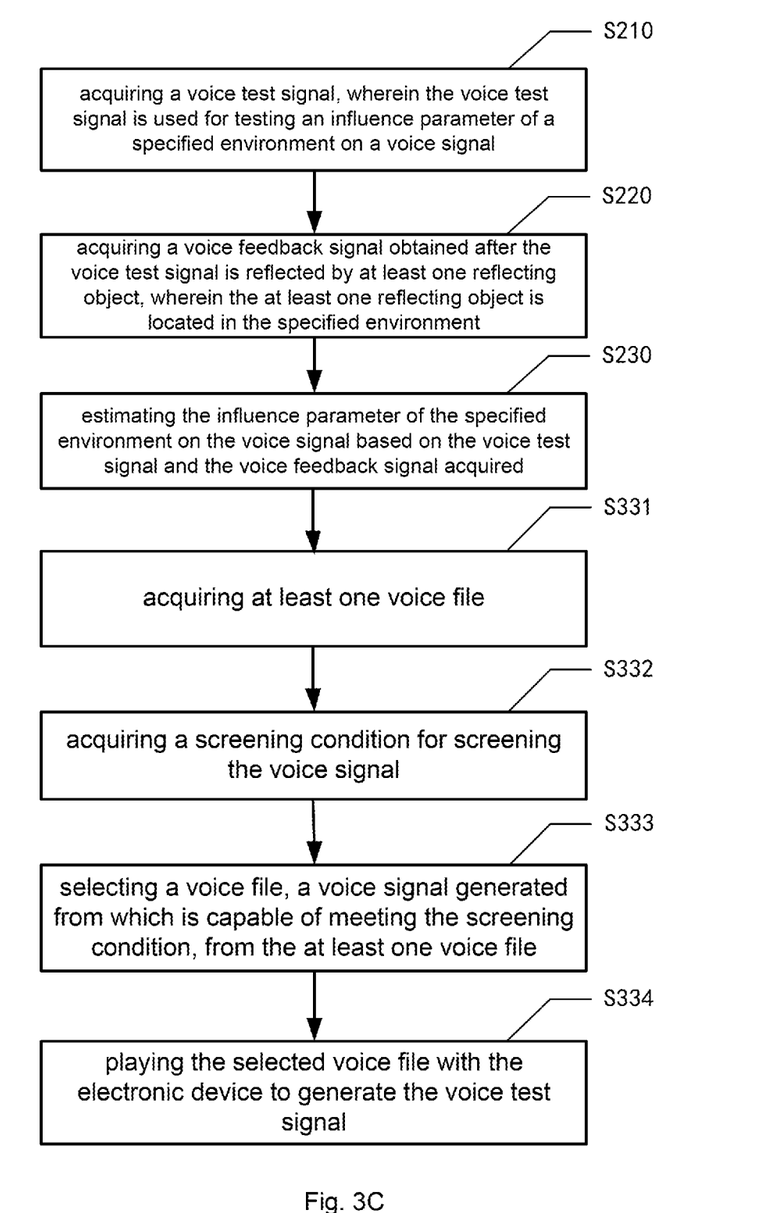
FIG. 3C schematically illustrates a flowchart of an information processing method according to another embodiment of the present disclosure.

FIG. 3C schematically illustrates a flowchart of an information processing method according to another embodiment of the present disclosure.

In this embodiment, in addition to operations S210~S230 described in the embodiment corresponding to FIG. 2 above, the information processing method may further include operations S331~S334. For brevity of description, descriptions of operations S210~S230 described in FIG. 2 are omitted here. As shown in FIG. 3C, in which:

In operation 331, at least one voice file is acquired, wherein each of the at least one voice file is able to generate a corresponding voice signal when played by the electronic device.

In operation 332, a screening condition for screening the voice signal is acquired.

In operation 333, a voice file, a voice signal generated from which is capable of meeting the screening condition, is selected from the at least one voice file.

In operation 334, the selected voice file is played with the electronic device to generate the voice test signal.

It should be noted that, in the embodiment of the present disclosure, the voice test signal played with the electronic device may include, but not limited to, the pulse signal mentioned in above embodiment, and may also include voice signals such as a greeting or of other features, which are not limited here.

Specifically, the screening conditions for screening the voice signals may be set in advance, such as energy concentration, small sidelobe and high peak, and the like, which are not specifically limited here, and may be adaptively selected according to specific circumstances of the specified environment that needs to be estimated. From the voice files capable of generating a corresponding voice signal through being played by the electronic device, a voice file that satisfies a preset screening condition is selected, and the voice file is played by the electronic device to generate a voice test signal.

According to the embodiments of the present disclosure, since a voice file whose voice signal generated can meet the screening condition is selected from the at least one voice file and the selected voice file is played with the electronic device to generate the voice test signal, a selection range for the voice test signal is larger. By screening the files that can generate the voice signals in the electronic device, quality and adaptability of the voice test signal can be improved, and a technical effect of improving accuracy of parameter estimation can be achieved.

Another aspect of the present disclosure provides an information processing system.

Figure 4:
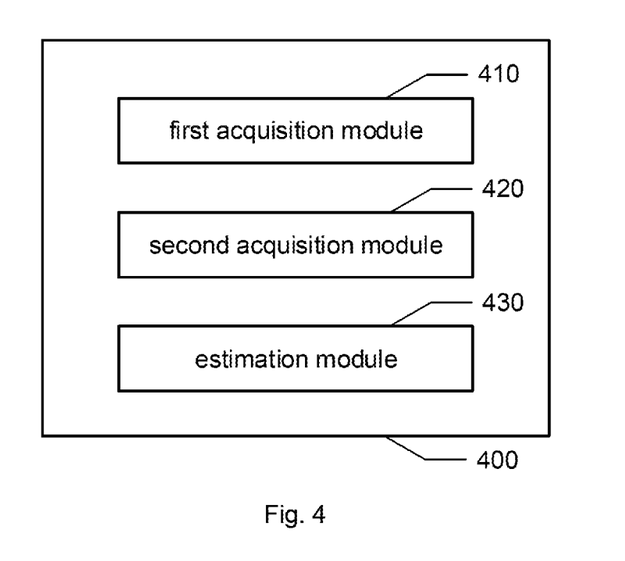
FIG. 4 schematically illustrates a block diagram of an information processing system according to an embodiment of the present disclosure.

FIG. 4 schematically illustrates a block diagram of an information processing system according to an embodiment of the present disclosure.

In this embodiment, the information processing system 400 includes a first acquisition module 410, a second acquisition module 420, and an estimation module 430. The information processing system 400 may perform the information processing method described above with reference to FIG. 2. As shown in FIG. 4, in which:

The first acquisition module 410 is configured to acquire a voice test signal, wherein the voice test signal is used for testing an influence parameter of a specified environment on a voice signal.

The second acquisition module 420 is configured to acquire a voice feedback signal obtained after the voice test signal is reflected by at least one reflecting object, wherein the at least one reflecting object is located in the specified environment.

The estimation module 430 is configured to estimate the influence parameter of the specified environment on the voice signal based on the voice test signal and the voice feedback signal acquired.

It may be understood that, the first acquisition module 410, the second acquisition module 420 and the estimation module 430 may be combined into one module for implementation, or any one of the modules may be split into multiple modules. Alternatively, at least part of functions of one or more of these modules may be combined with at least part of functions of other modules and implemented in one module. According to an embodiment of the present disclosure, at least one of the first acquisition module 410, the second acquisition module 420 and the estimation module 430 may be at least partially implemented as a hardware circuit, such as a field programmable gate array (FPGA), a programmable logic array (PLA), a system-on-chip, a system-on-substrate, a system-on-package, an application specific integrated circuit (ASIC), or it may be implemented by hardware or firmware that integrates or packages circuits in any other reasonable way, or it can be implemented by an proper combination of software, hardware and firmware. Alternatively, at least one of the first acquisition module 410, the second acquisition module 420 and the estimation module 430 may be at least partially implemented as a computer program module, and the program can perform the functions of the corresponding modules when executed at a computer.

According to the embodiment of the present disclosure, in a specified environment, a voice test signal for testing an influence parameter of the specified environment on a voice signal is acquired on the one hand, and a voice feedback signal obtained after the voice test signal is reflected by at least one reflecting object is acquired on the other hand, and the influence parameter of the specified environment on the voice signal is estimated based on the voice test signal and the voice feedback signal. By adopting such a technical solution, a technical problem in the related technology can be at least overcome in part. The technical problem in the related technology is as follows: when estimating the influence parameter of the specified environment on the voice signal, either it is necessary for a professional to estimate according to his experience, or it is necessary for a non-professional to make measurement using additional special detection equipment, which leads to inconvenience in operation, that is, poor feasibility. As a result, according to the embodiment of the present disclosure, an electronic device can adaptively complete by its self a measurement of the influence parameter of the specified environment on the voice signal according to changes of the specified environment, which is easy to operate and of strong feasibility, and can effectively reduce a use cost of the equipment.

Figure 5A:
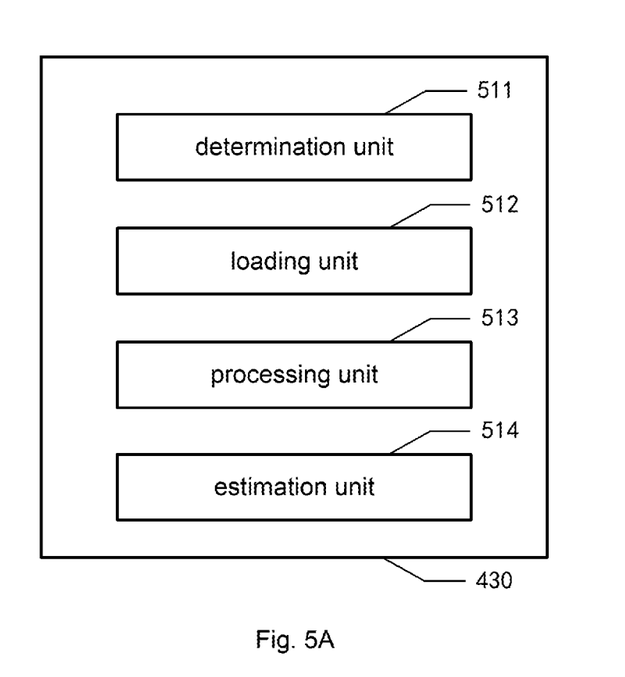
FIG. 5A schematically illustrates a block diagram of an estimation module according to an embodiment of the present disclosure.

FIG. 5A schematically illustrates a block diagram of an estimation module according to an embodiment of the present disclosure.

In this embodiment, in addition to the first acquisition module 410, the second acquisition module 420 and the estimation module 430 described in the embodiment corresponding to FIG. 4 above, the information processing system 400 may include a determination unit 511, a loading unit 512, a processing unit 513 and an estimation unit 514. For brevity of description, descriptions of the first acquisition module 410, the second acquisition module 420 and the estimation module 430 described in FIG. 4 are omitted here. As shown in FIG. 5A, the determination unit 511 is configured to determine test information corresponding to the voice test signal and feedback information corresponding to the voice feedback signal. The loading unit 512 is configured to load a parameter estimation model. The processing unit 513 is configured to input the test information and the feedback information into the parameter estimation model, so that the parameter estimation model outputs estimation information of the influence parameter in response to the test information and the feedback information. The estimation unit 514 is configured to estimate the influence parameter of the specified environment on the voice signal using the estimation information of the influence parameter.

According to the embodiments of the present disclosure, the voice feedback signal is obtained after being reflected by at least one reflecting object located in the specified environment, that is, the voice feedback signal modified by the specified environment directly carries influence factors of the specified environment on the voice signal, and the influence parameter is estimated by inputting the test information and feedback information determined by the voice test signal and the voice feedback signal into the parameter estimation model. Therefore, a purpose of processing large-scale data and a technical effect of simplifying the process and improving estimation accuracy can be achieved.

Figure 5B:
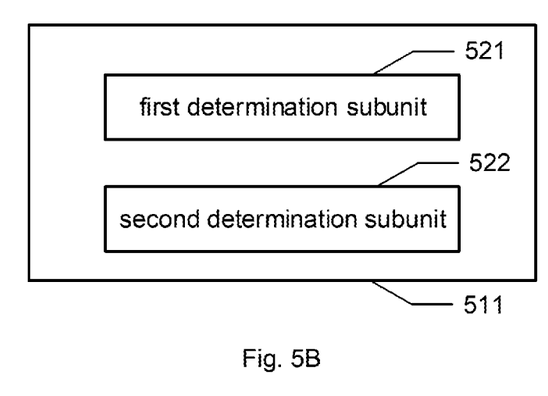
FIG. 5B schematically illustrates a block diagram of a determination unit according to an embodiment of the present disclosure.

FIG. 5B schematically illustrates a block diagram of a determination unit according to an embodiment of the present disclosure.

In this embodiment, in addition to the first acquisition module 410, the second acquisition module 420 and the estimation module 430 described in the embodiment corresponding to FIG. 4 above, and in addition to the determination unit 511, the loading unit 512, the processing unit 513 and the estimation unit 514 described in the embodiment corresponding to FIG. 5A above, the information processing system 400 may include a first determination subunit 521 and a second determination subunit 522. For brevity of description, descriptions of the first acquisition module 410, the second acquisition module 420 and the estimation module 430 described in FIG. 4, and descriptions of the determination unit 511, the loading unit 512, the processing unit 513 and the estimation unit 514 described in FIG. 5A are omitted here. As shown in FIG. 5B, the first determination subunit 521 is configured to determine a playing time when the electronic device plays a voice test signal, wherein the test information includes the playing time. The second determination subunit 522 is configured to determine a receiving time when the electronic device receives the voice feedback signal, and sound wave information of a sound wave corresponding to the voice feedback signal, wherein the feedback information includes the receiving time and the sound wave information, and the sound wave information includes an amplitude of the sound wave or energy of the sound wave.

According to the embodiments of the present disclosure, since the playing time of the test signal and the sound wave information of the feedback signal are acquired, an operation process is simplified and is of strong feasibility, and a technical effect of improving an estimation efficiency is achieved.

According to the embodiments of the present disclosure, the second acquisition module is further configured to acquire the voice feedback signal within a preset time period after the voice test signal is sent.

According to the embodiments of the present disclosure, since the feedback signal within a preset time period is acquired, signal redundancy and operation data can be reduced, and operation efficiency can be improved.

Figure 5C:
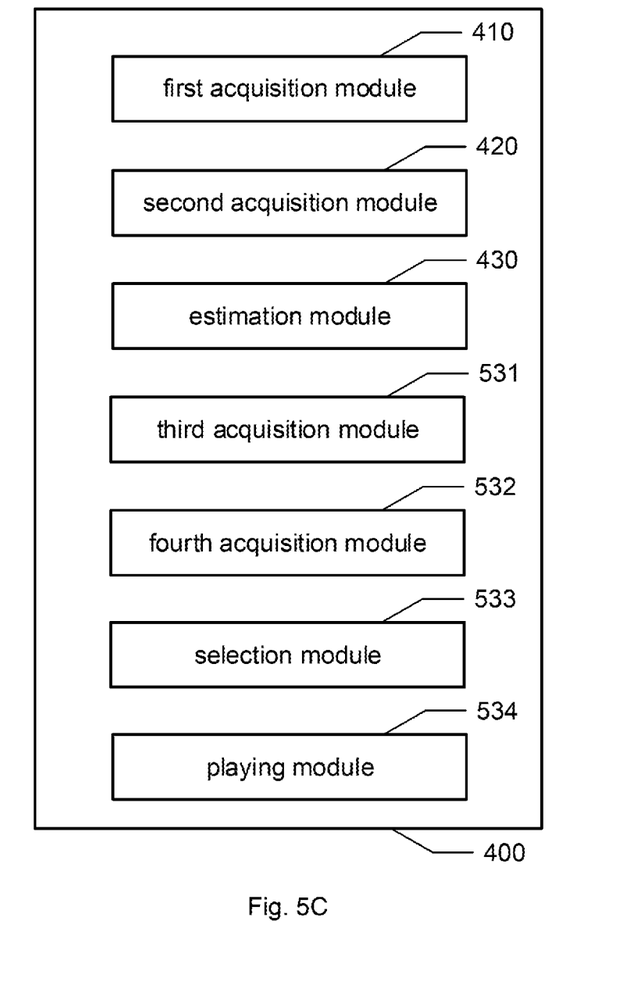
FIG. 5C schematically illustrates a block diagram of an information processing system according to another embodiment of the present disclosure.

FIG. 5C schematically illustrates a block diagram of an information processing system according to another embodiment of the present disclosure.

In this embodiment, in addition to the first acquisition module 410, the second acquisition module 420 and the estimation module 430 described in the embodiment corresponding to FIG. 4 above, the information processing system 400 may include a third acquisition module 531, a fourth acquisition module 532, a selection module 533 and a playing module 534. For brevity of description, descriptions of the first acquisition module 410, the second acquisition module 420 and the estimation module 430 described in FIG. 4 are omitted here. As shown in FIG. 5C, the third acquisition module 531 is configured to acquire at least one voice file, wherein each of the at least one voice file is able to generate a corresponding voice signal when played by the electronic device. The fourth acquisition module 532 is configured to acquire a screening condition for screening the voice signal. The selection module 533 is configured to select a voice file, a voice signal generated from which is capable of meeting the screening condition, from the at least one voice file. The playing module 534 is configured to play the voice file with the electronic device to generate the voice test signal.

According to the embodiments of the present disclosure, a voice file whose voice signal generated can meet the screening condition is selected from the at least one voice file and the selected voice file is played with the electronic device to generate the voice test signal, therefore, a selection range for the voice test signal is larger. By screening the files that can generate the voice signals in the electronic device, quality and adaptability of the voice test signal can be improved, and a technical effect of improving accuracy of parameter estimation can be achieved.

Figure 6:
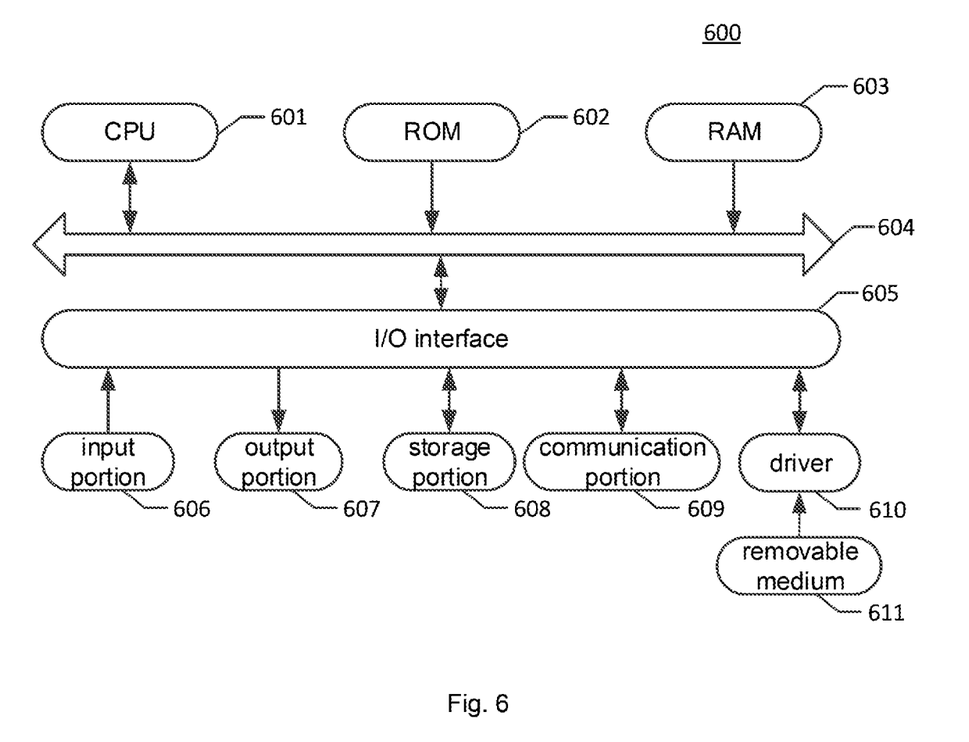
FIG. 6 schematically illustrates a block diagram of a computer system adaptable for implementing an information processing method and a system thereof according to an embodiment of the present disclosure.

FIG. 6 schematically illustrates a block diagram of a computer system adaptable for implementing an information processing method and a system thereof according to an embodiment of the present disclosure. The computer system shown in FIG. 6 is only an example, and should not impose any limitation on functions and use scope of the embodiments of the present disclosure.

As shown in FIG. 6, a computer system 600 according to the embodiments of the present disclosure includes a processor 601 that may perform various proper actions and processing according to a program stored in a read only memory (ROM) 602 or a program loaded from a storage portion 608 into a random access memory (RAM) 603. The processor 601 may include, for example, a general purpose microprocessor (for example, a CPU), an instruction set processor and/or an associated chipset and/or a special purpose microprocessor (for example, an application specific integrated circuit (ASIC)), and so on. The processor 601 may also include an on-board memory for caching purposes. The processor 601 may include a single processing unit or multiple processing units for performing different actions of the method flows according to the embodiments of the present disclosure described with reference to FIG. 2, and FIG. 3A~FIG. 3C.

In the RAM 603, various programs and data necessary for the operations of the system 600 are stored. The processor 601, the ROM 602 and the RAM 603 are connected to each other via a bus 604. The processor 601 performs various operations of the information processing method described above with reference to FIG. 2, and FIG. 3A~FIG. 3C by executing programs in the ROM 602 and/or the RAM 603. It should be noted that the program may also be stored in one or more memories other than the ROM 602 and the RAM 603. The processor 601 may also performs various operations of the information processing method described above with reference to FIG. 2, and FIG. 3A~FIG. 3C by executing a program stored in said one or more memories.

According to the embodiments of the present disclosure, the system 600 may further include an input/output (I/O) interface 605, and the input/output (I/O) interface 605 is also connected to the bus 604. The system 600 may further include one or more of the following components connected to the I/O interface 605: an input portion 606 including a keyboard, a mouse, and the like; an output portion 607 including such as a cathode ray tube (CRT), a liquid crystal display (LCD) and a speaker, and the like; a storage portion 608 including a hard disk, and the like; and a communication portion 609 including a network interface card such as a LAN card, a modem, and the like. The communication portion 609 performs communication processing via a network such as an Internet. A driver 610 is also connected to the I/O interface 605 as necessary. A removable medium 611, such as a magnetic disk, an optical disk, a magneto-optical disk, a semiconductor memory, and the like, is installed on the driver 610 as needed, so that a computer program read therefrom is installed into the storage portion 608 as needed.

According to the embodiments of the present disclosure, the method described above with reference to the flowchart may be implemented as a computer software program. For example, embodiments of the present disclosure include a computer program product including a computer program carried on a computer readable medium. The computer program contains program codes for performing the method shown in the flowchart. In such an embodiment, the computer program may be downloaded and installed from a network through the communication portion 609, and/or installed from the removable medium 611. When the computer program is executed by the processor 601, the above functions defined in the system of the embodiment of the present disclosure are performed. According to the embodiments of the present disclosure, the systems, devices, apparatus, modules, units, and the like, described above may be implemented by computer program modules.

It should be explained that the computer readable medium shown in the present disclosure may be a computer readable signal medium or a computer readable storage medium or any combination of above two. The computer readable storage medium may be, for example, but not limited to, electronic, magnetic, optical, electromagnetic, infrared, or semiconductor systems, apparatus or devices, or any combination thereof. More specific examples of computer readable storage media may include, but not limited to: electrical connections with one or more wires, portable computer disks, hard disks, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing. In this disclosure, a computer readable storage medium may be any tangible medium that contains or stores a program that can be used by or in combination with an instruction execution system, apparatus or device. In this disclosure, a computer readable signal medium may include a data signal that is included in baseband or propagated as part of a carrier, in which computer readable program codes are carried. Such a propagated data signal may take many forms, including but not limited to electromagnetic signals, optical signals, or any suitable combination of the foregoing. The computer readable signal medium may also be any computer readable medium other than a computer readable storage medium, and the computer readable medium may send, propagate, or transmit a program for use by or in connection with an instruction execution system, apparatus or device. Program codes embodied on a computer readable medium may be transmitted using any proper medium, including but not limited to wireless, wireline, optical cable, RF, and the like, or any suitable combination of the foregoing. According to the embodiments of the present disclosure, the computer readable medium may include the ROM 602 and/or the RAM 603 described above and/or one or more memories other than the ROM 602 and the RAM 603.

The flowcharts and block diagrams in the accompanying drawings illustrate the architectures, functionalities, and operations of possible implementations of systems, methods and computer program products according to various embodiments of the present disclosure. In this regard, each block in the flowcharts or block diagrams may represent a module, a program segment, or a part of code, which contains one or more of executable instructions used to implement the specified logic functions. It should also be noted that in some alternative implementations, the functions marked in the blocks may also occur in a different order than those marked in the drawings. For example, two successively represented boxes may actually be executed substantially in parallel, and they may sometimes be executed in the reverse order, depending on the functions involved. It should also be noted that each block in the block diagrams or flowcharts, and combinations of blocks in the block diagrams or flowcharts, may be implemented with a dedicated hardware-based system that performs the specified function or operation, or may be implemented with a combination of dedicated hardware and computer instructions.

As another aspect, the present disclosure also provides a computer readable medium, which may be included in the device described in above embodiments; or may exist alone without being assembled into the device. The computer readable medium carries one or more programs that when executed by one device, cause the device to perform an information processing method, including: acquiring a voice test signal, wherein the voice test signal is used for testing an influence parameter of a specified environment on a voice signal; acquiring a voice feedback signal obtained after the voice test signal is reflected by at least one reflecting object, wherein the at least one reflecting object is located in the specified environment; and estimating the influence parameter of the specified environment on the voice signal based on the voice test signal and the voice feedback signal acquired.

The embodiments of the present disclosure have been described above. However, these examples are for illustrative purposes only, and are not intended to limit the scope of the present disclosure. Although the embodiments have been described separately above, this does not mean that the measures in the respective embodiments cannot be used in an advantageous combination. The scope of the disclosure is defined by the following claims and their equivalents. Without departing from the scope of the present disclosure, those skilled in the art can make various substitutions and modifications, and these substitutions and modifications should all fall within the scope of the present disclosure.

I claim:

1. An information processing method, comprising:
   acquiring voice files, wherein each of the voice files is able to generate a corresponding voice signal when played by an electronic device;
   acquiring a plurality of screening conditions condition for screening the voice signal;
   selecting a voice file that is able to generate a voice signal which is capable of meeting the plurality of screening conditions from the voice files;
   playing the selected voice file with the electronic device to generate a voice test signal;
   acquiring the voice test signal, wherein the voice test signal is used for testing an influence parameter of a specified environment on a voice signal;
   acquiring, by the electronic device, a voice feedback signal obtained after the voice test signal is reflected by at least one reflecting object, wherein the at least one reflecting object is located in the specified environment; and
   estimating the influence parameter of the specified environment on the voice signal based on the voice test signal and the voice feedback signal acquired,
   wherein the plurality of screening conditions comprise energy concentration, small sidelobe and high peak.

2. The method of claim 1, wherein estimating the influence parameter of the specified environment on the voice signal based on the voice test signal and the voice feedback signal acquired comprises:
   determining test information corresponding to the voice test signal and feedback information corresponding to the voice feedback signal;
   loading a parameter estimation model;
   inputting the test information and the feedback information into the parameter estimation model, so that the parameter estimation model outputs estimation information of the influence parameter in response to the test information and the feedback information; and
   estimating the influence parameter of the specified environment on the voice signal using the estimation information of the influence parameter.

3. The method of claim 2, wherein determining test information corresponding to the voice test signal and feedback information corresponding to the voice feedback signal comprises:
   determining a playing time when an electronic device plays the voice test signal, wherein the test information comprises the playing time; and
   determining a receiving time when the electronic device receives the voice feedback signal, and sound wave information of a sound wave corresponding to the voice feedback signal, wherein the feedback information comprises the receiving time and the sound wave information, and the sound wave information comprises an amplitude of the sound wave or energy of the sound wave.

4. The method of claim 1, wherein acquiring a voice feedback signal obtained after the voice test signal is reflected by at least one reflecting object comprises:
   acquiring the voice feedback signal within a preset time period after the voice test signal is sent.

5. An information processing system, comprising:
   a first acquisition module, configured to acquire a voice test signal, wherein the voice test signal is used for testing an influence parameter of a specified environment on a voice signal;
   a second acquisition module, configured to acquire a voice feedback signal obtained after the voice test signal is reflected by at least one reflecting object, wherein the at least one reflecting object is located in the specified environment; and
   an estimation module, configured to estimate the influence parameter of the specified environment on the voice signal based on the voice test signal and the voice feedback signal acquired;
   a third acquisition module, configured to acquire voice files, wherein each of the voice files is able to generate a corresponding voice signal when played by an electronic device;
   a fourth acquisition module, configured to acquire a plurality of screening conditions for screening the voice signal;
   a selection module, configured to select a voice file that is able to generate a voice signal which is capable of meeting the plurality of screening conditions from the voice files;
   a playing module, configured to play the selected voice file with the electronic device to generate the voice test signal,
   wherein the plurality of screening conditions comprise energy concentration, small sidelobe and high peak.

6. The system of claim 5, wherein the estimation module comprises:
   a determination unit, configured to determine test information corresponding to the voice test signal and feedback information corresponding to the voice feedback signal;
   a loading unit, configured to load a parameter estimation model;
   a processing unit, configured to input the test information and the feedback information into the parameter estimation model, so that the parameter estimation model outputs estimation information of the influence parameter in response to the test information and the feedback information; and
   an estimation unit, configured to estimate the influence parameter of the specified environment on the voice signal using the estimation information of the influence parameter.

7. The system of claim 6, wherein the determination unit comprises:
   a first determination subunit, configured to determine a playing time when an electronic device plays the voice test signal, wherein the test information comprises the playing time; and
   a second determination subunit, configured to determine a receiving time when the electronic device receives the voice feedback signal, and sound wave information of a sound wave corresponding to the voice feedback signal, wherein the feedback information comprises the receiving time and the sound wave information, and the sound wave information comprises an amplitude of the sound wave or energy of the sound wave.

8. The system of claim 5, wherein the second acquisition module is further configured to:
   acquire the voice feedback signal within a preset time period after the voice test signal is sent.

9. A computer system, comprising:
   one or more processors; and
   a storage, configure to store one or more programs,
   wherein the one or more programs, when executed by the one or more processors, cause the one or more processors to implement the information processing method of claim 1.

10. A non-transitory machine readable storage medium having stored thereon executable instructions that, when executed by a processor, cause the processor to implement the information processing method of claim 1.

* * * * *